(12) United States Patent
Roslund et al.

(10) Patent No.: US 6,948,919 B2
(45) Date of Patent: Sep. 27, 2005

(54) HERMETIC MOTOR AND GAS BOOSTER

(75) Inventors: Eric Roslund, Huntersville, NC (US); Steve Doolittle, Cornelius, NC (US)

(73) Assignee: Ingersoll-Rand Energy Systems Corporation, Portsmouth, NH (US)

( * ) Notice: Subject to any disclaimer, the term of this patent is extended or adjusted under 35 U.S.C. 154(b) by 170 days.

(21) Appl. No.: 10/627,212

(22) Filed: Jul. 25, 2003

(65) Prior Publication Data

US 2005/0099075 A1 May 12, 2005

Related U.S. Application Data

(60) Provisional application No. 60/432,274, filed on Dec. 10, 2002.

(51) Int. Cl.[7] .............................................. F04B 17/00
(52) U.S. Cl. ............................ 417/423.7; 417/410.4; 417/423.8
(58) Field of Search ..................... 417/366, 410.4, 417/423.7, 423.11, 423.8

(56) References Cited

U.S. PATENT DOCUMENTS

| | | | |
|---|---|---|---|
| 2,958,292 A | | 11/1960 | Lipe et al. |
| 3,192,861 A | | 7/1965 | Haegh |
| 3,870,914 A | * | 3/1975 | Walker .................. 310/219 |
| 3,989,011 A | | 11/1976 | Takahashi |
| 4,086,508 A | * | 4/1978 | Masumoto et al. ........... 310/86 |
| 4,797,071 A | | 1/1989 | Veyrat |
| 5,214,932 A | | 6/1993 | Abdelmalek |
| 5,431,551 A | | 7/1995 | Aquino et al. |
| 5,467,613 A | | 11/1995 | Brasz |
| 5,580,233 A | | 12/1996 | Wakana et al. |
| 5,674,056 A | * | 10/1997 | Yamamoto et al. ......... 417/366 |
| 6,066,898 A | | 5/2000 | Jensen |
| 6,217,304 B1 | | 4/2001 | Shaw |
| 6,231,317 B1 | | 5/2001 | Watanabe et al. |
| 6,266,952 B1 | | 7/2001 | Choroszylow et al. |
| 6,443,712 B2 | | 9/2002 | Sakai et al. |
| 6,484,490 B1 | | 11/2002 | Olsen et al. |
| 6,499,301 B1 | | 12/2002 | Choroszylow et al. |
| 6,499,967 B2 | | 12/2002 | Hansen |

FOREIGN PATENT DOCUMENTS

JP 62-181640 * 8/1987

* cited by examiner

*Primary Examiner*—Louis J. Casaregola
(74) *Attorney, Agent, or Firm*—Michael Best & Friedrich LLP

(57) ABSTRACT

A fuel booster operable to compress a combustible fuel, the fuel booster comprising a compressor housing a compress rotor, and a seal assembly coupled to the compressor housing. The seal assembly and the compressor housing cooperate to at least partially define a hermetically sealed compressor chamber. A motor housing is coupled to the seal assembly. The motor housing and seal assembly cooperate to at least partially define a motor chamber that is sealed from the compressor chamber to prevent fluid flow therebetween. The fuel booster also includes a motor having a motor rotor and a motor stator. The motor rotor and the compressor rotor are contained within the compressor chamber. The motor rotor includes a cylindrical surface. The motor stator substantially surrounds the cylindrical surface and is contained within the motor chamber.

20 Claims, 6 Drawing Sheets

HERMETIC MOTOR AND GAS BOOSTER

RELATED APPLICATION DATA

This application claims benefit under 35 U.S.C. Section 119(e) of U.S. Provisional Application 60/432,274 filed Dec. 10, 2002.

BACKGROUND OF THE INVENTION

The present invention relates to a system and method for providing fuel to a combustor. More particularly, the present invention relates to a system and method for increasing the pressure of a gaseous fuel for delivery to the combustor.

Combustion turbine engines are well suited to burning many different types of fuels. Commonly, these engines burn natural gas provided at line pressure to the engine. However, combustion turbine engines, and particularly microturbine combustion engines are also well suited to burning other fuels such as methane or other volatile organic compounds (VOCs) that are typically available at low pressures. In order to operate efficiently using these low-pressure fuel sources, it is necessary to increase the fuel pressure for delivery to the combustor of the combustion turbine engine.

Many prior engines employ a fuel compressor that includes a slide valve that controls the compressor output (i.e., pressure or flow rate). However, slide valves increase the maintenance requirements of the compressor and are susceptible to sticking and leakage.

SUMMARY OF THE PREFERRED EMBODIMENTS

The present invention provides a fuel booster operable to compress a combustible fuel, the fuel booster comprising a compressor housing, a compressor rotor, and a seal assembly coupled to the compressor housing. The seal assembly and the compressor housing cooperate to at least partially define a hermetically sealed compressor chamber. A motor housing is coupled to the seal assembly. The motor housing and seal assembly cooperate to at least partially define a motor chamber that is sealed from the compressor chamber to prevent fluid flow therebetween. The fuel booster also includes a motor having a motor rotor and a motor stator. The motor rotor and the compressor rotor are contained within the compressor chamber. The motor rotor includes a cylindrical surface. The motor stator substantially surrounds the cylindrical surface and is contained within the motor chamber.

In another embodiment, the invention provides a microturbine engine comprising a compressor operable to produce a flow of compressed air and a recuperator in fluid communication with the compressor to receive the flow of compressed air. The flow of compressed air is preheated within the recuperator to produce a flow of preheated compressed air. The engine also includes a fuel booster having a motor, a compressor assembly, a seal assembly, a compressor housing, and a motor housing. The seal assembly is coupled to the motor housing to at least partially define therebetween a motor chamber and the seal assembly is coupled to the compressor housing to at least partially define therebetween a compressor chamber. The compressor chamber is substantially hermetically isolated from the motor chamber by the seal assembly and contains the compressor assembly. The motor includes a motor rotor and a motor stator. The motor rotor is contained within the compressor chamber, and the motor stator is contained within the motor chamber. The motor drives the compressor assembly to produce a flow of compressed fuel. The engine further includes a combustor receiving the flow of preheated compressed air from the recuperator and the flow of compressed fuel from the fuel booster. The combustor combusting the flow of preheated compressed air and the flow of compressed fuel to produce a flow of products of combustion. A power turbine is driven by the flow of products of combustion from the combustor. A sensor is operable to measure an engine parameter and a motor drive is operable to vary the speed of the motor to maintain the engine parameter at a desired value.

In yet another embodiment, the invention provides a method of providing combustible fuel to an engine to achieve a desired engine parameter. The method including interconnecting a compressor housing, a motor housing, and a seal assembly to produce a compressor chamber and a motor chamber. The method also includes substantially hermetically isolating the compressor chamber from the motor chamber with the seal assembly. The method further includes supporting a compressor rotor and a motor rotor for rotation within the compressor chamber and supporting a motor stator within the motor chamber. The method also includes providing power to the motor stator to rotate the compressor rotor at a speed. The method further includes measuring the engine parameter and adjusting the power provided to the motor stator to adjust the compressor rotor speed in response to the measured engine parameter.

Additional features and advantages will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which.

Before any embodiments of the invention are explained, it is to be understood that the invention is not limited in its application to the details of construction and the arrangements of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof is meant to encompass the items listed thereafter and equivalence thereof as well as additional items.

DETAILED DESCRIPTION OF THE DRAWINGS

Microturbine engines are relatively small and efficient sources of power. Microturbines can be used to generate electricity and/or to power auxiliary equipment such as pumps or compressors. In addition, microturbine engines can be used in cogeneration arrangements that generate electricity and perform an additional function such as heat water. When used to generate electricity, microturbines can be used independent of the utility grid or synchronized to the utility grid. In general, microturbine engines are limited to applications requiring 2 megawatts (MW) of power or less. However, some applications larger than 2 MWs may utilize one or more microturbine engines.

Figure 1:
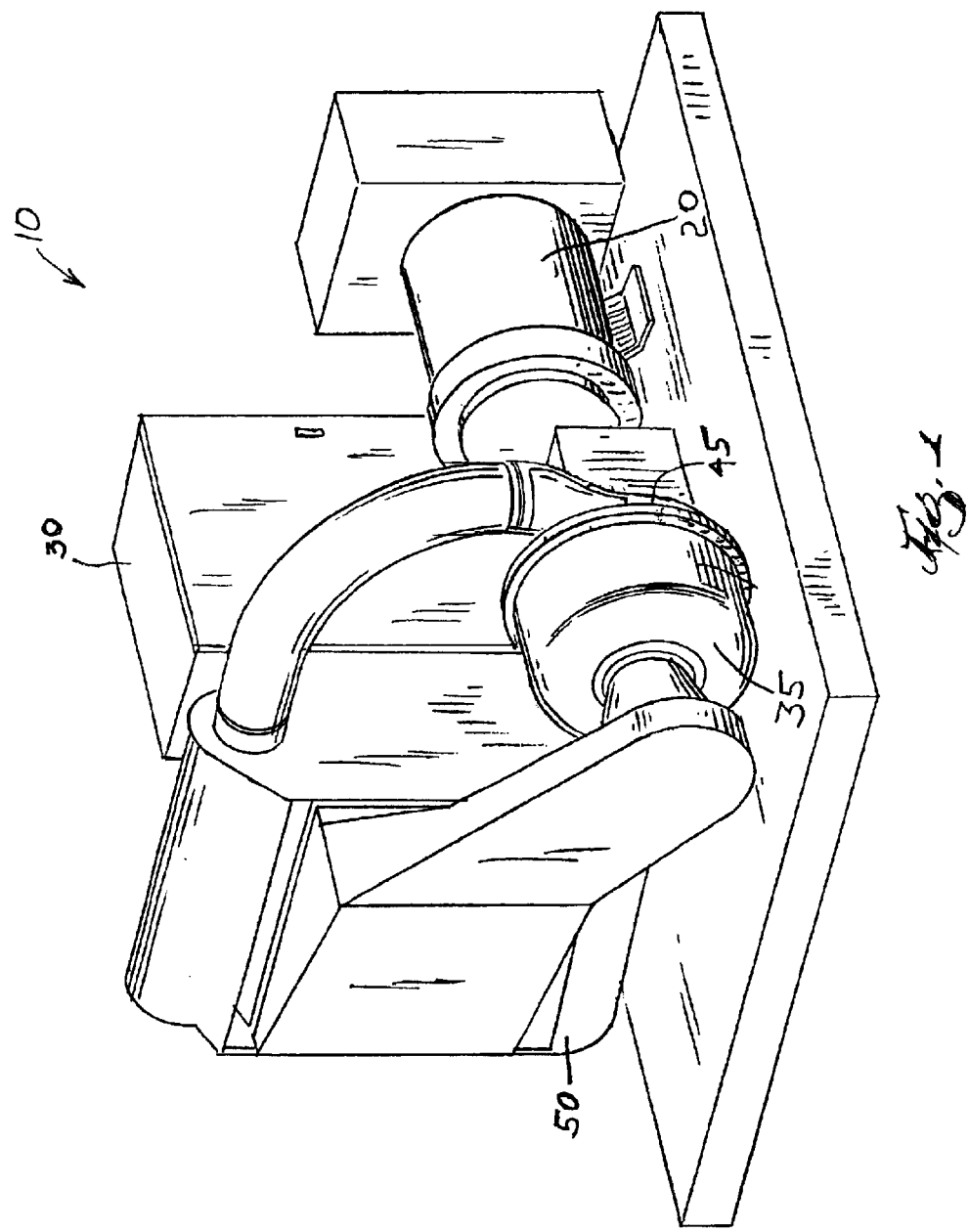
FIG. 1 is a perspective view of a combustion turbine engine.
Figure 2:
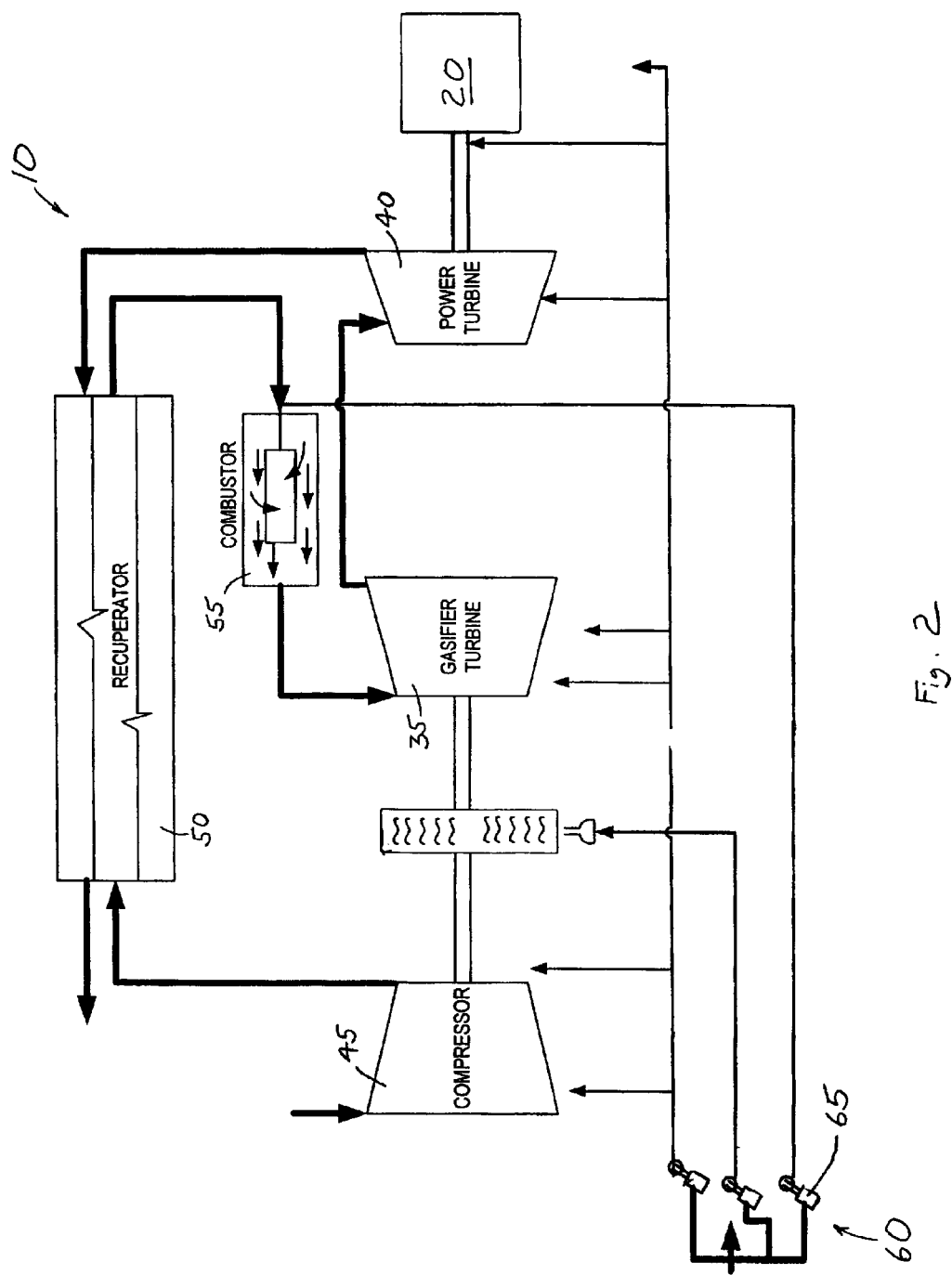
FIG. 2 is a schematic illustration of the combustion turbine engine of FIG. 1.

One construction of a microturbine engine system 10 is illustrated in FIG. 1 and schematically illustrated in FIG. 2. With reference to FIG. 2, the microturbine engine system 10 includes a turbine section 15 and a generator 20. The turbine section 15 is schematically illustrated in FIG. 2 and includes a gasifier turbine 35, a power turbine 30, a compressor 35, a recuperator 50, and a combustor 55. The turbine section 15 also includes various auxiliary systems such as a fuel supply system 60. The fuel supply system 60 includes a gas booster 65 that draws fuel from a reservoir or other fuel source and supplies the fuel under pressure to the combustor 55.

The illustrated engine 10 is based on a standard Brayton cycle with a recuperator 50 added to improve engine efficiency. The engine 10 shown is a multi-spool engine (more than one set of rotating elements). However, single spool engines are also contemplated by the invention. The compressor 45 is a centrifugal-type compressor having a rotary element that rotates in response to operation of the gasifier turbine 35. The compressor 45 shown is generally a single-stage compressor however, multi-stage compressors can be employed where a higher pressure ratio is desired. Alternatively, compressors of different designs (e.g., axial-flow compressors) can be employed to supply air to the engine.

The gasifier turbine 35 is a radial inflow single-stage turbine having a rotary element directly or indirectly coupled to the rotary element of the compressor 45. In other constructions, multi-stage turbines or axial flow turbines are employed as gasifier turbines 35. The rotary element of the power turbine 40 extends out of the turbine section 15 and engages the generator section 20, a gearbox, or another speed changer disposed between the turbine section 15 and the generator section 20.

The recuperator 50 includes a heat exchanger employed to transfer heat from a hot fluid to the relatively cool compressed air leaving the compressor 45. The recuperator 50 includes a plurality of heat exchange cells stacked on top of one another to define flow paths therebetween. The cool compressed air flows within the individual cells, while a flow of hot exhaust gas passes between the heat exchange cells.

During operation of the microturbine engine system 10, the rotary element of the compressor 45 rotates in response to rotation of the rotary element of the gasifier turbine 35. The compressor 45 draws in atmospheric air and increases its pressure. The high-pressure air exits the air compressor 45 and flows to the recuperator 50.

The flow of compressed air, now preheated within the recuperator 50, flows to the combustor 55 as a flow of preheated air. The preheated air mixes with a supply of fuel within the combustor 55 and is combusted to produce a flow of products of combustion.

The flow of products of combustion enters the gasifier turbine 35 and transfers thermal and kinetic energy to the turbine 35. The energy transfer results in rotation of the rotary element of the turbine 35 and a drop in the temperature of the products of combustion. The products of combustion exit the gasifier turbine 35 as a first exhaust gas flow.

The power turbine 40 receives the first exhaust flow and discharges a second exhaust flow. The rotary element of the power turbine 40 rotates in response to the flow of exhaust gas therethrough. The rotary element of the power turbine 40 is connected to the rotary element of the device to be driven, in the case of FIG. 1, the generator 20. The power turbine 40 of FIG. 1 drives the generator 20 at a fixed speed to produce the desired electrical output (e.g., 3600 or 1800 RPM for a 60 Hz system, 3000 or 1500 RPM for a 50 Hz system).

The second exhaust flow enters the flow areas between the heat exchange cells of the recuperator 50 and transfers excess heat energy to the flow of compressed air. The exhaust gas then exits the recuperator 50 and is discharged to the atmosphere, processed, or further used as desired (e.g., cogeneration of hot water).

The invention described herein is for use with many different fuels including volatile organic compounds ("VOCs"). The term VOC includes those types of compounds that are the by-products or waste products of systems that process or otherwise use or create volatile chemicals. For example, manufacturers or producers of PVC, plastics, rubber, glue, varnish, petrochemicals, pharmaceuticals, and organic chemicals may create VOCs. Companies that employ paint spraying booths that use air guns to apply paint to products may also create VOCs. Other examples of companies that may produce VOCs include oil refineries, furniture manufacturers or refurbishers, and computer chip manufacturers that use solvents to clean the chips. There are many other companies that produce VOCs, and the foregoing is not intended to be a limiting list. VOCs are also sometimes referred to as hazardous airborne pollutants ("HAP") or solvent-laden air ("SLA").

Figure 3:
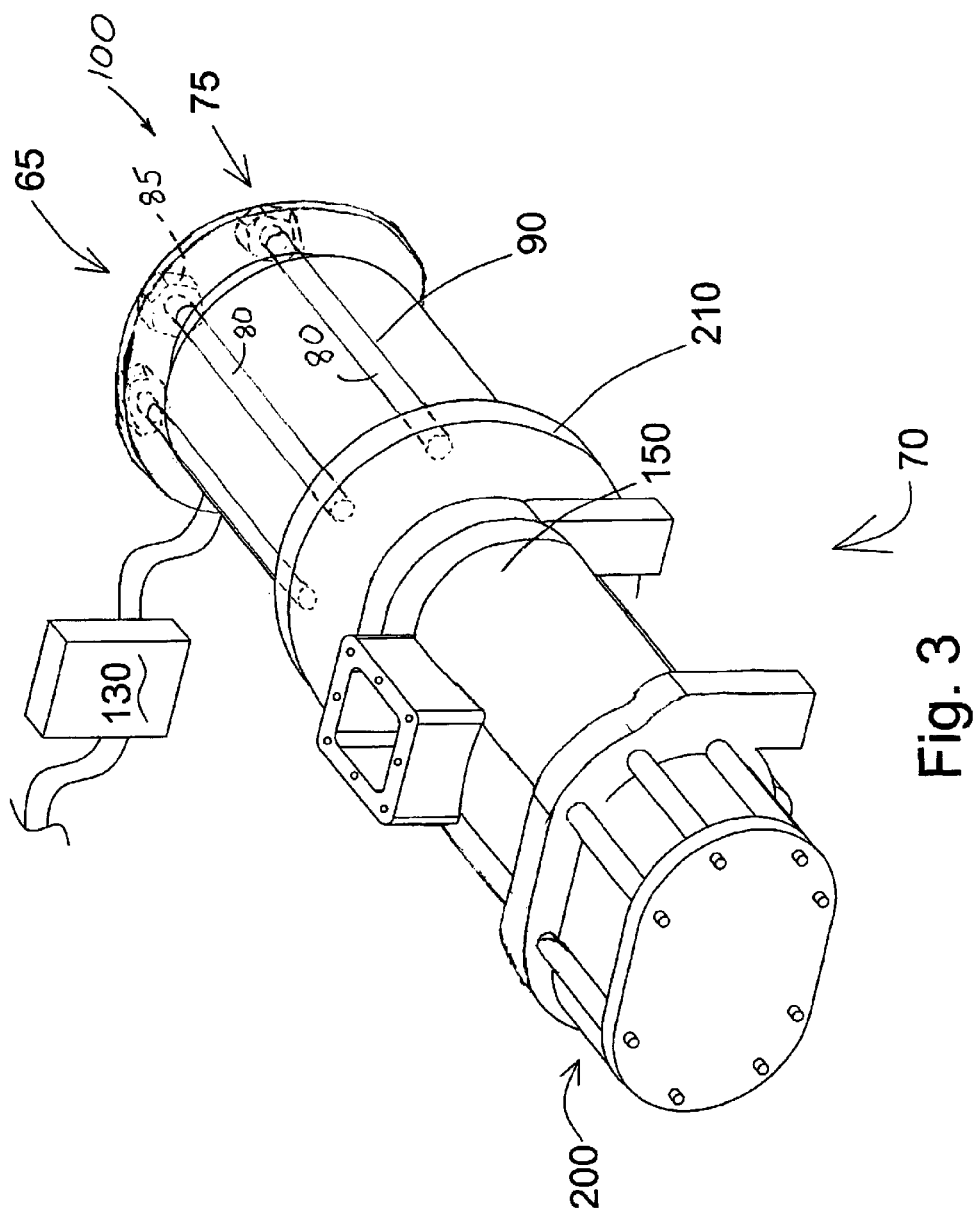
FIG. 3 is a perspective view of the gas compressor of FIG. 2.

With reference to FIG. 3, the gas booster 65 of the present invention includes a compressor section 70, attached to a motor section 75. A series of external tie rods 80 facilitate the attachment of the compressor section 70 to the motor section 75. The tie rods are threaded on one end and include an integral head on the other end. In another construction, the tie rods 80 include nuts 85 on either end that allow for the tightening of the tie rods 80. Alternatively, one or both ends thread into the motor section 75 and/or the compressor section 70 directly.

The motor section 75 (illustrated in FIGS. 4 and 5) includes a housing 90, a compressor motor 95, and a cooling assembly 100. The housing 90 is a generally hollow metal container that supports and substantially surrounds the compressor motor 95 and the cooling assembly 100. The housing 90 includes an open end 105 defined by a circular lip portion 110. The lip portion 110 facilitates the attachment of the motor housing 90 to the compressor section 70. In addition to the open end 105, cooling holes (not shown) may be located in the motor housing 90 to allow air to pass through and cool the compressor motor 95 and the cooling assembly 100. While a metal housing 90 is preferred, other materials such as plastics or composites can also be used to form the motor housing 90. No matter the material used, the housing 90 should be rigid enough to support the compressor motor 95 and the cooling assembly 100 during operation.

The compressor motor 95 is an AC induction motor operable across a wide speed range. The compressor motor 95 includes a stator 115 having a cylindrical opening 120 and a rotor 125 supported for rotation within the cylindrical opening 120. A variable frequency drive 130 provides voltage and current to the compressor motor 95 at a desired frequency to drive the compressor motor 95. The rotational speed of the motor 95 varies with the frequency of the power provided by the variable frequency drive 130. In other constructions, other variable speed motors are employed. For example, a variable speed DC motor is also well suited to the task of driving the compressor section.

The cooling assembly 100 includes a motor 135 and a fan 140 driven by the motor 135. The cooling assembly 100 is operable to move air over the compressor motor 95 and cool the compressor motor 95 during operation. The cooling assembly 100 attaches to the compressor motor 95, or alternatively is supported directly by the motor housing 90. The cooling assembly motor 135 operates independent of the compressor motor 95 to rotate the fan 140 and move air over the compressor motor 95. A temperature sensor (not shown), timer, or other known means can be used to cycle the cooling motor 135 on and off. In most constructions, the cooling motor 135 operates whenever the compressor motor 95 is in operation, thus assuring an adequate air supply and more efficient operation of the compressor motor 95.

Figure 4:
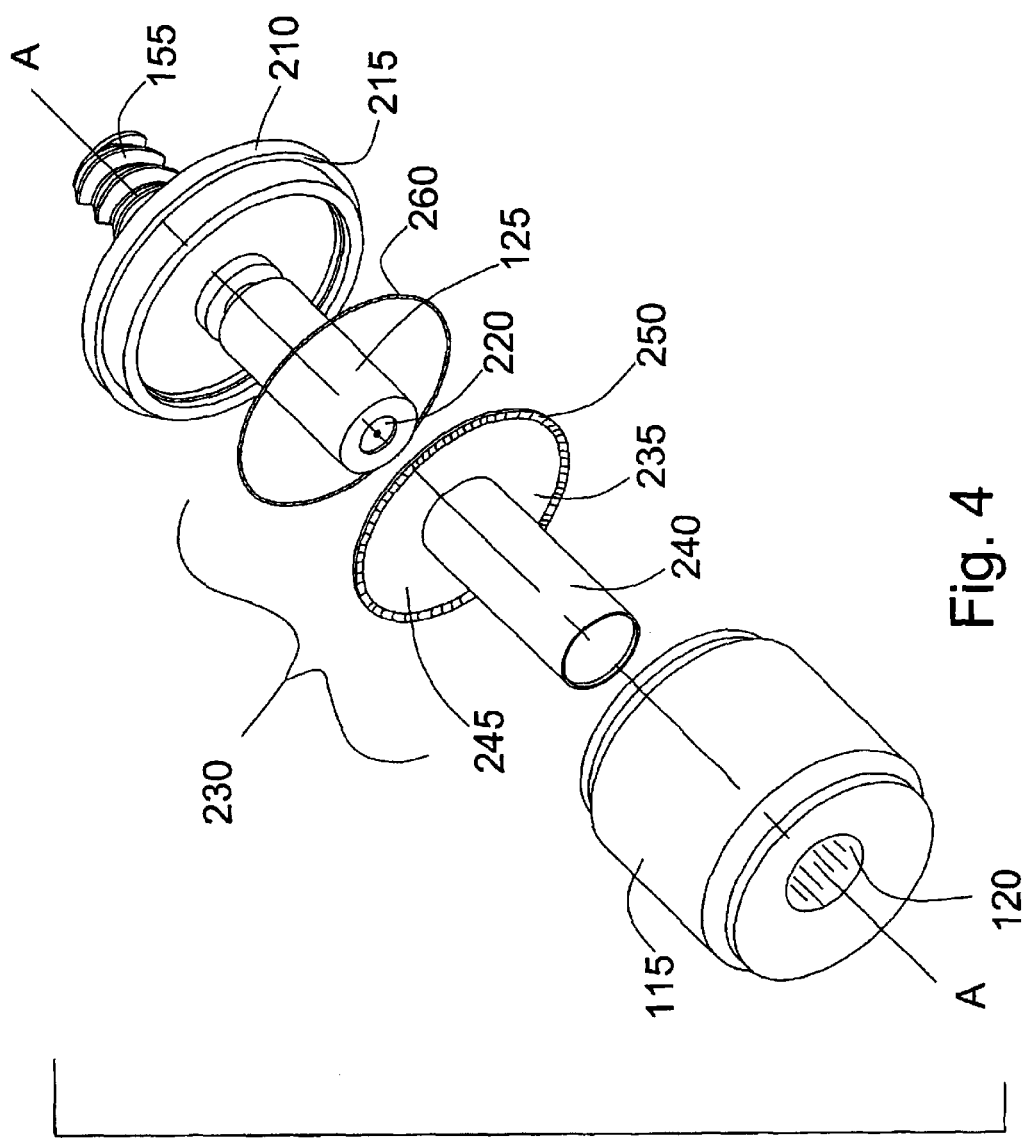
FIG. 4 is an exploded view of the gas compressor of FIG. 2.
Figure 5:
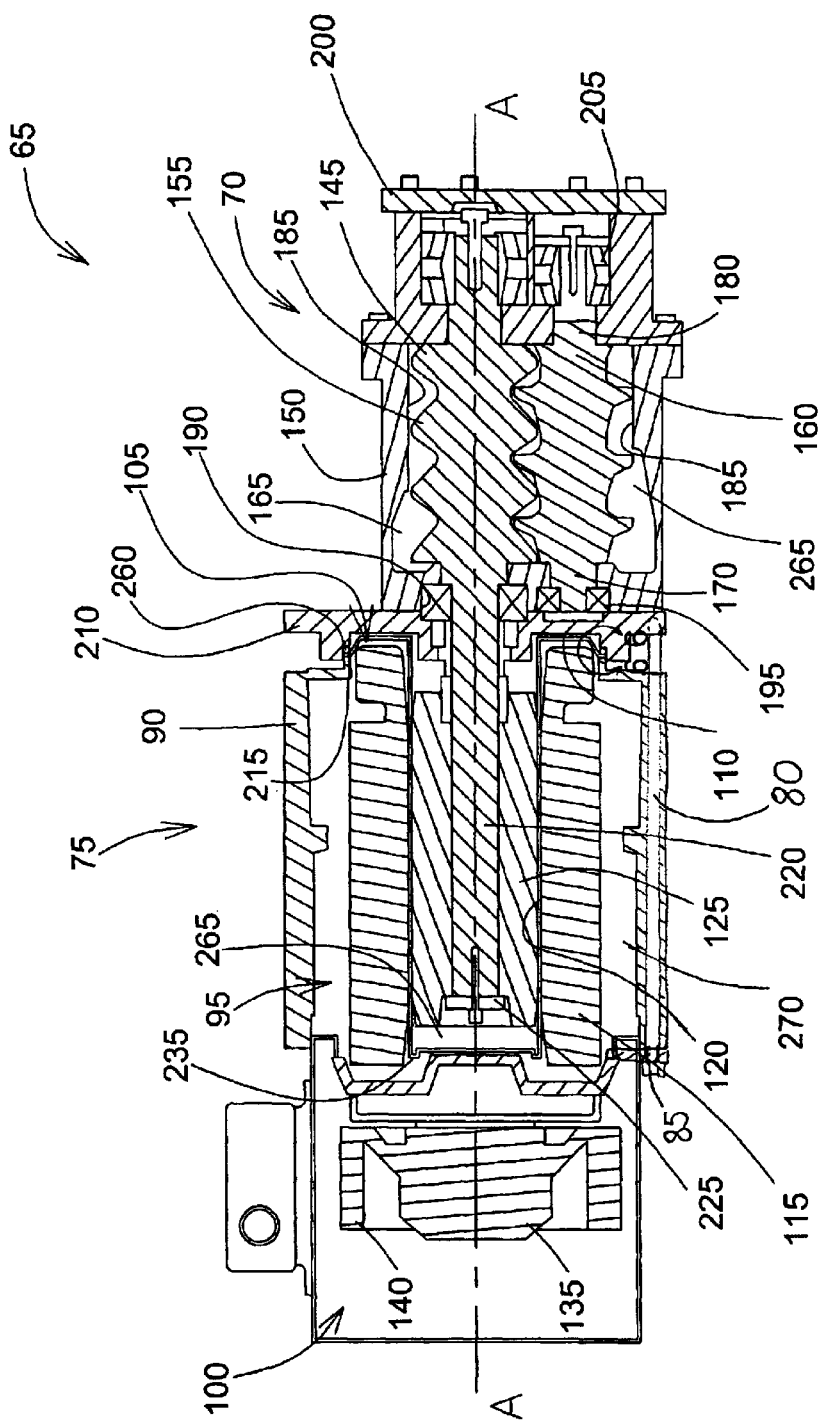
FIG. 5 is a cross-sectional view of the gas compressor of FIG. 2.

With continued reference to FIGS. 4 and 5, the compressor section 70 includes an oil-flooded screw compressor 145 substantially contained within a compressor housing 150. The oil-flooded screw compressor 145 includes a male rotor 155 and a female rotor 160 engaged with the male rotor 155. The engaged rotors 155, 160 partially define a suction chamber 165 adjacent a first end 170 of the rotors 155, 160 and a discharge chamber (not shown) adjacent a second end 180 of the rotors 155, 160. The suction chamber 165 substantially surrounds the first end 170 of the rotors 155, 160 to allow for the easy intake of fuel into the rotors 155, 160.

Rotation of the male rotor 155 produces a corresponding rotation of the female rotor 160. As the rotors 155, 160 rotate, low-pressure fuel is drawn into the rotors 155, 160 and conveyed the length of the rotors 155, 160 to the discharge chamber where the fuel is discharged as a high-pressure fluid.

While a two-rotor compressor is illustrated, three, four or more rotors can be employed in the compressor as desired. Additional rotors are employed to increase the flow rate of the compressor. Other constructions may employ other types of screw compressors or other types of compressors (e.g., rotary gear, centrifugal, and the like). These compressors function well to compress fuel for the microturbine engine 10.

The compressor housing 150 is a substantially rigid structure that includes two intersecting bores 185 sized to tightly receive the male rotor 155 and the female rotor 160. The housing 150 also partially defines the suction chamber 165 and the discharge chamber. An inlet port (not shown) extends through the housing 150 and into the suction chamber 165. A pipe or flange connects directly to the inlet port and feeds low-pressure fuel to the suction chamber 165. The pipe connection also seals the inlet port and suction chamber 165 from the atmosphere.

The compressor housing 150 includes two bearing bores 190 adjacent the first end 170 of the rotors 155, 160. Bearings 195 positioned in the bearing bores 190 support the first end 170 of the rotors 155, 160 for rotation. Roller bearings provide adequate support for the first ends 170 of the rotors 155, 160 with other constructions employing other types of bearings (e.g., ball, needle air, magnetic, foil, journal and the like).

A discharge housing 200 attaches to the compressor housing 150 adjacent the second end 180 of the rotors 155, 160. The discharge housing 200, in conjunction with the rotors 155, 160 and the compressor housing 150, completely define the discharge chamber. The discharge housing 200 includes an outlet port (not shown) that feeds high-pressure fuel from the discharge chamber to the combustor 55, a pipe, or a storage tank depending on the engine arrangement. The discharge housing 200 also includes two bearings 205 positioned to support the second ends 180 of the rotors 155, 160 for rotation. The bearings 205 supported in the discharge housing 200 support the rotors 155, 160 for rotation and also support the axial and radial load produced as the rotors 155, 160 move and compress fuel. It should be understood that the bearings 195 supporting the first end 170 of the rotors 155, 160 could be used to support the axial thrust load as well as the radial load if desired.

An adapter plate 210 attaches to the compressor housing 150 adjacent the first end 170 of the rotors 155, 160 to complete the compressor housing 150. The adapter plate 210 abuts the bearing 195 supporting the first end 170 of the male rotor 155 and provides a seal that prevents air from entering the suction chamber 165 through the bearing 195. The adapter plate 210 also holds both of the first end bearings 195 in place, thereby preventing unwanted movement along the axis of rotation A-A of the rotors 155, 160. In addition, the adapter plate 210 provides a circular interface portion 215 sized to receive the lip portion 110 of the motor housing 90 when the components are assembled.

The male rotor 155 includes a drive portion 220 that extends out of the compressor housing 150. The drive portion 220 facilitates the attachment of the compressor motor 95 to the male rotor 155 to power the compressor 70. In the construction illustrated herein, the compressor motor rotor 125 is an annular cylinder that attaches to the drive portion 220 of the male rotor 155. As such, no coupling is required between the motor rotor 125 and the male rotor 155. Rather, a locking piece 225 attaches to the end of the male rotor 155 to hold the motor rotor 125 in place. In other constructions, a coupling attaches a separate motor rotor to the male rotor 155.

While a seal can be achieved between a stationary and a rotating surface (i.e., between the compressor housing and the male rotor), the seal would include components that require additional maintenance and care and are susceptible to wear and leakage. To provide a hermetic seal without the use of undesirable wear components, a seal assembly 230 including a canister 235 covers the motor rotor 125 and engages the adapter plate 210. The canister 235, illustrated in FIG. 4 includes a hollow tubular portion 240 sealed at one end and opened at the opposite end. The open end of the canister includes a flat annular portion 245 and a seal portion 250. The seal portion 250 has a diameter approximately equal to the diameter of the lip portion 110 of the motor housing 90.

Figure 6:
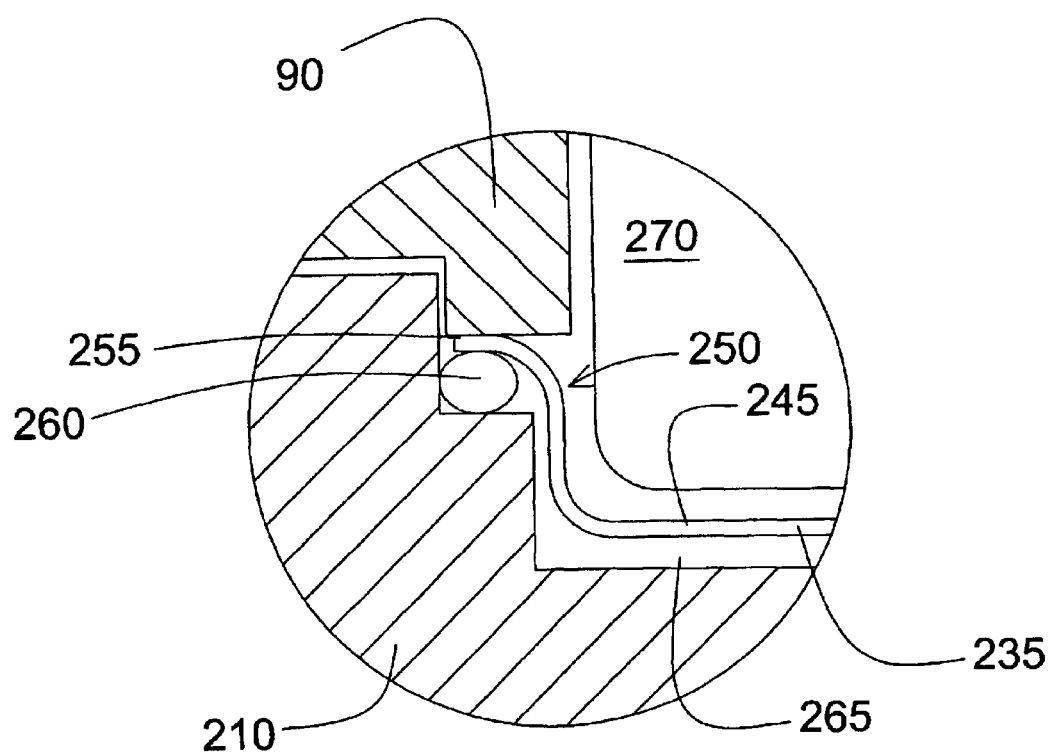
FIG. 6 is an enlarged view of an O-ring seal.

With reference to FIG. 6, the seal portion 250 of the canister 235 is shown in greater detail. The seal portion 250 includes a leg 255 that covers an O-ring 260 and traps the O-ring 260 against the adapter plate 210. The lip portion 110 of the motor housing 90 contacts the leg 255 and pushes it toward the adapter plate 210 to compress the O-ring 260. With the canister 235 in place, the canister 235 and the compressor housing 150 cooperate to define a compressor chamber 265 that is hermetically sealed from the outside atmosphere (with the exception of the fuel inlet and fuel outlet). The canister 235 also cooperates with the motor housing 90 to define a motor chamber 270.

While a magnetic material can be used, the canister 235 is preferably manufactured from a substantially non-magnetic material such as stainless steel, aluminum, Inconel, plastic, composites, ceramics, and the like. The use of a non-magnetic material reduces the interference in motor operation caused by the separation of the motor rotor 125 and the motor stator 115.

It should be noted that the term hermetic is generally used to describe motors or compressors that are permanently sealed. For example, hermetic compressors often include a welded housing that cannot be opened without destroying or damaging the housing. The present invention includes a hermetic seal, however that seal can be broken without destroying the components. As such, the gas booster is not a true hermetic compressor/motor arrangement. However, during operation of the gas booster, the compressor chamber is hermetically sealed and the use of the term "hermetic" is appropriate.

To assemble the gas booster 65 the motor rotor 125 is attached to the drive portion 220 of the male rotor 155 that extends out of the assembled compressor section 70. The canister 235 is then positioned within the cylindrical opening 120 defined by the stator 115. Once the canister 235 is installed, the O-ring 260 is positioned as illustrated in FIGS. 3 and 4. The male rotor 155 of the motor section 75 fits within the canister 235 installed within the cylindrical opening 120. Once the lip portion 110 of the motor housing 90 contacts the leg portion 255 of the canister 235, the tie rods 80 are tightened to compress the O-ring 260 and complete the assembly.

In operation, the compressor motor 95 is supplied with power to initiate rotation of the motor rotor 125. Rotation of the motor rotor 125 produces a corresponding rotation of the male rotor 155 and the female rotor 160 within the compressor housing 150. Low-pressure fuel drawn into the suction chamber 165 moves along the rotors 155, 160 and is discharged at the discharge chamber. If necessary, power is also supplied to the cooling assembly 100 to provide cooling air for the motor 95.

The variable frequency drive 130 provides power to the motor 95 to control the output pressure and/or flow rate of the compressor section 70. During operation, one or more sensors (not shown) monitor an engine parameter (e.g., fuel pressure, fuel flow rate, power output, turbine outlet temperature and the like). The rotational speed of the compressor motor 95 is controlled to maintain the engine parameter at a desired value. For example, one system monitors fuel booster discharge pressure (fuel pressure) and varies the speed of the compressor motor 95 to achieve a desired fuel pressure. If the pressure is too high, the speed of the compressor motor 95 is reduced via the variable frequency drive 130. If the pressure is too low, the compressor motor speed is increased. In another construction, the engine parameter is the fuel flow rate as measured by a fuel flow meter (not shown) positioned downstream of the fuel booster 65. When the flow rate exceeds a desired value, the variable frequency drive 130 reduces the frequency of the power provided to the compressor motor 95 to reduce the speed of the compressor motor 95 and the flow rate. If the flow rate is too low, the compressor motor speed is increased by the variable frequency drive 130 to increase the flow rate to the desired value. In yet another construction, the turbine outlet temperature is measured, directly or indirectly and the compressor motor speed is controlled to maintain a desired turbine outlet temperature. The aforementioned system controls the output of the compressor 70 without the use of a conventional slide valve. One of ordinary skill will realize that many different parameters can be used in a control system that controls the speed of the compressor motor 95. As such, the invention should not be limited to the few examples described.

In this way, a low-pressure fuel supply, such as VOCs, can be used to power a microturbine engine 10. The fuel pressure is first increased by the gas booster 65 and then combined with the high-pressure air flowing to, or within a combustor 55 and combusted to produce useful work (i.e., power a generator 20). For example, the illustrated gas booster 65 is able to take gaseous fuel at a pressure of 0.65 psig, or lower, and pressurize the gas to a pressure of 30 psig to 50 psig. The illustrated gas booster 65 is also able to deliver suitable quantities (e.g., 10 cfm to 25 cfm) of fuel to the combustor 55 to operate the microturbine engine 10.

The foregoing example is exemplary of some of the operating parameters under which the gas booster 65 is capable of operating. It should be understood that higher or lower inlet pressures can be accommodated by the gas booster 65. Furthermore, higher or lower output pressures can also be achieved if necessary. In addition, the flow rates given are exemplary of flow rate requirements for a particular engine 10. The gas booster 65 can be used to deliver higher or lower flow rates if necessary.

While the constructions described herein include a microturbine engine 10, the gas booster 65 is not limited to use with microturbine engines 10. The gas booster 65 can be used with other prime movers (e.g., internal combustion engines, steam turbines, Sterling engines, and the like). For example, the gas booster 65 could supply fuel to a boiler for combustion. The heat generated by the combustion produces steam that powers a steam turbine. In another application, the fuel is provided to a combustor and combusted to provide a heat source for a Sterling engine.

Although the invention has been described in detail with reference to certain preferred embodiments, variations and modifications exist within the scope and spirit of the invention as described and defined in the following claims.

What is claimed is:

1. A fuel booster operable to compress a combustible fuel, the fuel booster comprising:
    a compressor housing;
    a compressor rotor;
    a seal assembly coupled to the compressor housing, the seal assembly and the compressor housing cooperating to at least partially define a hermetically sealed compressor chamber;
    a motor housing coupled to the seal assembly, the motor housing and the seal assembly cooperating to at least partially define a motor chamber that is sealed from the compressor chamber to prevent fluid flow therebetween; and
    a motor including a motor rotor and a motor stator, the motor rotor and the compressor rotor contained within the compressor chamber, the motor rotor including a cylindrical surface, the motor stator substantially surrounding the cylindrical surface and contained within the motor chamber;
    wherein the compressor rotor is a first compressor rotor, the fuel booster further comprising a second compressor rotor engaged with the first compressor rotor, the first compressor rotor and the second compressor rotor contained within the compressor chamber.

2. The fuel booster of claim 1, wherein the compressor housing includes a fuel inlet aperture and a fuel outlet aperture.

3. The fuel booster of claim 1, wherein the compressor rotor includes a drive portion that extends into the motor stator, and wherein the motor rotor includes an annular sleeve connected to the drive portion.

4. The fuel booster of claim 1, wherein the seal assembly includes a canister sized to cover the motor rotor and contact the compressor housing.

5. The fuel booster of claim 4, wherein the seal assembly includes an O-ring positioned between the canister and the compressor housing.

6. The fuel booster of claim 5, wherein the O-ring is compressed between the motor housing and the compressor housing when said housings are interconnected.

7. The fuel booster of claim 1, wherein the compressor housing includes an adapter plate connected to the motor housing.

8. The fuel booster of claim 1, wherein the compressor housing includes a discharge housing, the discharge housing receiving a flow of high-pressure fuel from the compressor rotor and discharging the high-pressure fuel flow to a combustor.

9. The fuel booster of claim 1, further comprising a variable frequency drive operable to drive the motor at a desired speed.

10. The fuel booster of claim 1, further comprising a cooling fan motor operable to drive a cooling fan independent of the motor to cool the motor.

11. A fuel booster operable to compress a combustible fuel, the fuel booster comprising:

a compressor housing;

a compressor rotor;

a seal assembly coupled to the compressor housing, the seal assembly and the compressor housing cooperating to at least partially define a hermetically sealed compressor chamber;

a motor housing coupled to the seal assembly, the motor housing and the seal assembly cooperating to at least partially define a motor chamber that is sealed from the compressor chamber to prevent fluid flow therebetween;

a motor including a motor rotor and a motor stator, the motor rotor and the compressor rotor contained within the compressor chamber, the motor rotor including a cylindrical surface, the motor stator substantially surrounding the cylindrical surface and contained within the motor chamber; and a cooling fan motor operable to drive a cooling fan independent of the motor to cool the motor.

12. The fuel booster of claim 11, wherein the compressor housing includes a fuel inlet aperture and a fuel outlet aperture.

13. The fuel booster of claim 11, wherein the compressor rotor is a first compressor rotor, the fuel booster further comprising a second compressor rotor engaged with the first compressor rotor, the first compressor rotor and the second compressor rotor contained within the compressor chamber.

14. The fuel booster of claim 11, wherein the compressor rotor includes a drive portion that extends into the motor stator, and wherein the motor rotor includes an annular sleeve connected to the drive portion.

15. The fuel booster of claim 11, wherein the seal assembly includes a canister sized to cover the motor rotor and contact the compressor housing.

16. The fuel booster of claim 15, wherein the seal assembly includes an O-ring positioned between the canister and the compressor housing.

17. The fuel booster of claim 16, wherein the O-ring is compressed between the motor housing and the compressor housing when said housings are interconnected.

18. The fuel booster of claim 11, wherein the compressor housing includes an adapter plate connected to the motor housing.

19. The fuel booster of claim 11, wherein the compressor housing includes a discharge housing, the discharge housing receiving a flow of high-pressure fuel from the compressor rotor and discharging the high-pressure fuel flow to a combustor.

20. The fuel booster of claim 11, further comprising a variable frequency drive operable to drive the motor at a desired speed.

\* \* \* \* \*